United States Patent

[11] 3,628,046

[72] Inventor Alberto Bilotti
Williamstown, Mass.
[21] Appl. No. 871,327
[22] Filed Nov. 3, 1969
[45] Patented Dec. 14, 1971
[73] Assignee Sprague Electric Company
North Adams, Mass.
Original application July 31, 1967, Ser. No. 657,410, now Patent No. 3,548,326.
Divided and this application Nov. 3, 1969, Ser. No. 871,327

[54] DOUBLE BALANCED GATE CIRCUIT
11 Claims, 6 Drawing Figs.

[52] U.S. Cl. .......... 307/241, 178/5.45 D, 307/233, 328/133, 329/101, 329/50, 330/30 D, 332/44
[51] Int. Cl. .......... H03k 17/60
[50] Field of Search .......... 330/30 D; 332/143 B, 43, 24, 44; 329/50, 103, 110, 101; 328/133, 134; 178/5.45 D; 307/232, 242, 243, 244, 233, 241

[56] References Cited

UNITED STATES PATENTS

| | | | |
|---|---|---|---|
| 3,241,078 | 3/1966 | Jones | 329/50 |
| 3,330,972 | 7/1967 | Malan | 307/232 X |
| 3,449,677 | 6/1969 | Isaacs et al. | 329/50 |
| 3,550,040 | 12/1970 | Sinusas | 307/242 X |

*Primary Examiner*—Alfred L. Brody
*Attorneys*—Connolly and Hutz, Vincent H. Sweeney, James P. O'Sullivan and David R. Thornton

ABSTRACT: A multistage limiter having overall negative feedback is directly coupled in an integrated circuit to a discriminator which includes a double balanced gate circuit having a pair of differential switching means fed by a third differential switching means which is in series with a current source. A voltage divider provides the third switch with DC bias at a first level and provides the switch pair with DC bias at a second level. The third switch receives a signal directly from the limiter output while the switch pair receives a differentiated signal through the discriminator.

DOUBLE BALANCED GATE CIRCUIT

This is a division of application Ser. No. 657,410, filed July 31, 1967, and issued Dec. 15, 1970 as U.S. Letters Pat. No. 3,548,316.

BACKGROUND OF THE INVENTION

This invention pertains to limiter-discriminator circuits and more particularly to an integrated limiter-discriminator circuit which utilizes direct coupling and double balanced gated detection.

Many types of limiter-discriminator circuits are available in the prior art; however, these circuits utilize many components such as multielement vacuum tubes which are not suited for integrated circuitry. Moreover, these circuits generally fail to reject waveform asymmetries.

It is an object of this invention to provide a double gating circuit which eliminates carrier frequency, rejects waveform asymmetries of the input signal, and is capable of functioning as a detector or mixer.

It is a further object of this invention to provide a double balanced gating circuit capable of double ended output.

These and other objects of the invention will be apparent from the following description and claims taken in conjunction with the accompanying drawing.

SUMMARY OF THE INVENTION

Broadly, a limiter-discriminator circuit for translating frequency modulation of an input signal to amplitude modulation comprises a limiter which produces a substantially square wave reference signal. The limiter is directly coupled to a discriminator which includes an LC circuit, a gating circuit and an integrating means. The LC circuit provides a quadrature signal from the reference signal and the gate circuit is responsive to both the reference and quadrature signal so that the integrating means provides an amplitude envelope proportional to the phase difference of these signals during each half cycle thereof.

In the preferred embodiment, a voltage divider provides a first and second DC reference voltage for the limiter and discriminator. The limiter has a plurality of stages and includes an overall negative feedback which stabilizes all stages at the first DC level, and the gate circuit includes a pair of differential switching means fed by a third differential switching means which is in series with a current source. A control means of the third switch is DC biased at the first reference level and receives a reference signal directly from the limiter output while the control means of the switch pair are DC biased at the second voltage level and receive a differentiated signal through the resonant circuit.

In a more limited sense, each limiter stage is a pair of transistors connected as a differential amplifying pair with direct cascading through an emitter follower. The stages are stabilized at the first voltage reference by a base connection of the second and succeeding stages to this voltage level and a negative feedback loop from the emitter follower of the output stage to the base of the first stage.

Moreover, each switch is also a pair of transistors connected in a common emitter arrangement, with the common emitter providing one branch and their collectors providing a branch pair for each switch. The transistor bases provide control means which are DC biased at the appropriate reference voltage and driven by the output of the amplifier. One base of each of the first and second switches which make up the parallel pair of switches are connected in parallel to the limiter output through the resonant circuit which provides a quadrature phase shift to the signal. The driven base of the third switch is connected directly to the amplifier output.

Broadly a double balanced gating circuit, provided in accordance with the invention, comprises a first and second differential switching means fed by a third differential switching means and a current source, a first terminal means for application of a first signal to a control means of said first and second differential switch, and a second terminal means for application of a second signal to a control means of said third switch so as to provide a gate circuit output which is a function of both signals during each half cycle thereof.

In a more limited sense, each switching means includes a control means capable of diverting a portion or all of the current of a single branch of each switch through either of a pair of branches in accordance with the polarity and magnitude of a control signal. The single branch of the first and second switching means is coupled to one of the pair of branches, respectively, of the third switching means, and the single branch of the third switching means is coupled to the current source such that the current of the first and second switch is responsive to the control signal of the third switch and the current through the branch pairs of the first and second switches are responsive to the control signal of all the switches.

In a more limited sense, each switching means includes a pair of transistors having a common connection of one current carrying element, which provides one branch of the switch. The bases provide the control means, while the other current carrying element of each transistor provides the branch pair of each switch. For NPN-transistors, the emitters provide the common branch and the collectors provide the branch pair.

When used as a detector, both input signals are made to have the same frequency. For phase detection the signals exceed the threshold switching value of the transistors so that the output is proportional to the difference in phase between signals. For synchronous detection, however, although signal frequency is identical, the amplitude of an information bearing signal is made less than the threshold switching value of the transistors it controls so that these transistors operate linearly whereby the circuit output provides an amplitude envelope proportional to that of the information signal. In this case, the other signal generally is made to exceed the threshold switching value of the transistors it controls.

Finally, for use as a mixer, input signals of different frequencies are employed. The amplitude of the information bearing signal is again made less than the switching value, whereas the amplitude of the other signal is made more or less than the switching value depending upon whether square wave or a sinusoidal driving mode is desired. In either mode, the gate output provides a combination of signal frequencies, such as the difference between them.

DESCRIPTION OF THE PREFERRED EMBODIMENTS

Figure 1:
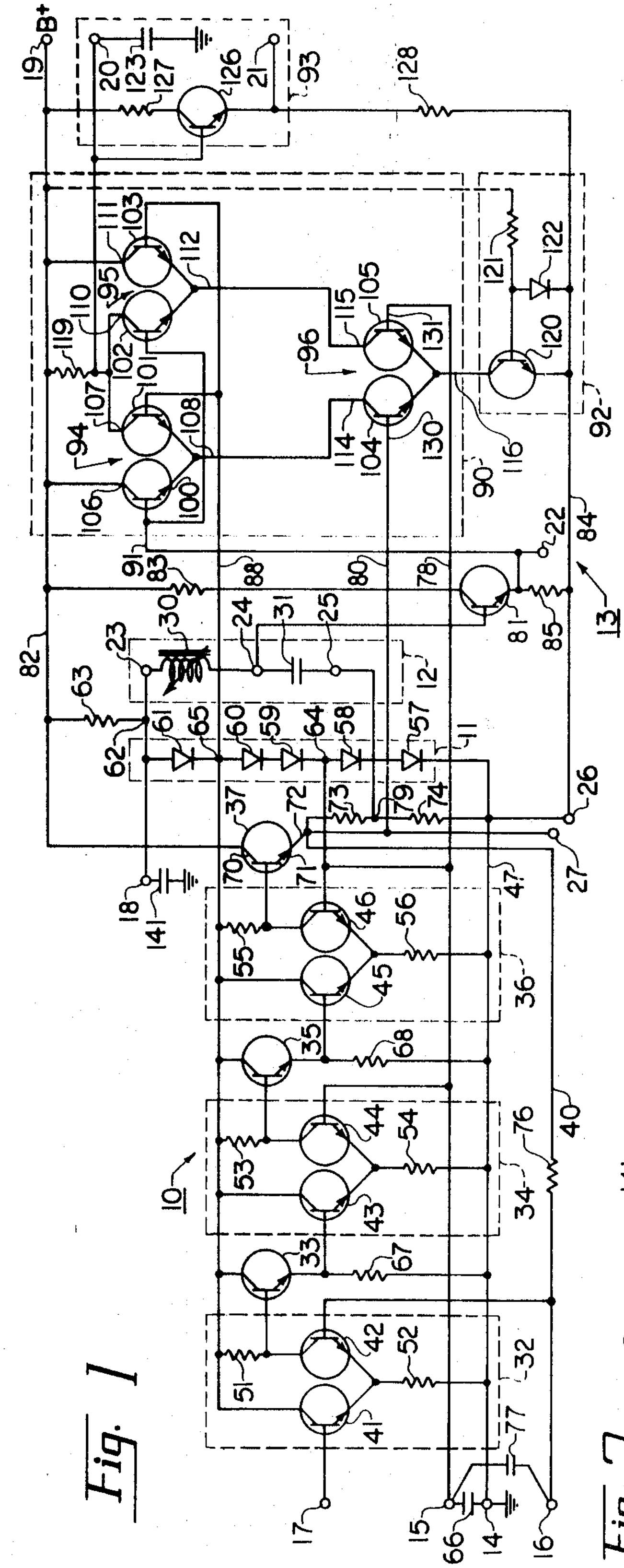
FIG. 1 is a schematic diagram of a limiter-discriminator circuit provided in accordance with the invention.

The circuit of FIG. 1 is made up of a limiter 10, a voltage divider 11, a resonant network 12, and a detector 13. The circuit is designed for circuit integration and hence the schematic diagram includes the terminal points 14–16 of the integrated chip 28 shown in FIG. 2, as well as its external circuitry.

The basic functions of the novel circuit are to provide amplification, amplitude limiting, frequency to phase translation and phase to amplitude translation of an input signal. These functions are realized by the indicated units shown in units shown in FIGS. 1 and 2. In the preferred embodiment all active and resistive components are integrated in chip 28 with the amplifier-limiter 10 coupled to the detector 13 by an external LC network 12 consisting of an inductor 30 and a capacitor 31.

Limiter 10 consists of three stages. 32, 34 and 36, directly cascaded through emitter followers 33, 35 and 37 respectively, which provides a square wave output for a sinusoidal input signal impressed on input terminals 15 and 17. Each stage is biased at a first and second voltage reference level and the limiter is stabilized by an overall DC feedback loop 40. For very low input signals, the three stages operate as linear amplifiers. However, when the signal is increased to above the threshold limiting value the unit becomes a limiter.

Each stage 32, 34 and 36, comprises a pair of transistors 41, 42 and 43, 44 and 45, 46, respectively, which are connected in a common emitter arrangement as differential amplifier stages.

Symmetrical clipping, which maintains good AM rejection, is provided by keeping each transistor pair well balanced; that is, by matching the base-emitter junction of each differential pair with that of its emitter follower and by biasing both at the same voltage level. For symmetrical clipping, the quiescent current through one differential transistor must equal that of the other transistor of that stage. Consequently, the current $I_Q$ of each transistor will equal one-half the total emitter current, or $I_e/2$, and it follows, that the peak value of the clipped collector voltage, ΔVC, must equal this current times the collector resistance Rc, thus: $\Delta Vc = I_Q Rc = (I_e/2) Rc$.

Moreover for cascading without a coupling capacitor, zero DC offset is required between stages; that is the DC level of the output must equal the bias level. This is accomplished by making the collector voltage level V*c* twice that of the base voltage V*b* and the collector resistance R*c* twice that of the emitter resistance R*e*. In the preferred embodiment, the collector resistance of each stage, that is resistors 51, 53, and 55, is each 1K ohms, whereas the emitter resistances 52, 54 and 56 are 500 ohms. Finally, the emitter base junction of each emitter follower 33, 35 and 37 should also be matched to that of the amplifier transistors.

Equal biasing is provided by a first and second reference voltage derived from voltage divider 11. This circuit branch includes five series connected diodes 57, 58, 59, 60 and 61. One end of divider 11 is tied to ground line 47 while the other end is connected at junction 62 to the resonant circuit 12 and through resistor 63 to the B+ terminal 19. Resistor 63 is chosen to obtain sufficient current through the diodes at the minimum power supply voltage, minimum resistor value and minimum operating temperature. A resistance of 1000 ohms is a suitable value for resistor 63 since it provides, under normal conditions, a current of 9 ma. through diode 61 and 3 ma. through the remainder of the diode string. The B+, in the preferred embodiment, is 12 volts and the voltage at junction 62 is 9 volts.

As indicated, a first and second voltage reference level are provided by voltage divider 11. The first reference level, which provides the control bias V*b* is connected at junction 64 which is two diodes (57 and 58) above ground. The second reference level, which provides the collector bias V*c* of each amplifier stage, is connected at junction 65 and is four diodes (57, 58, 59 and 60) above the ground. These reference voltages also provide the reference biases for the quadrature detector and in conjunction with the overall feedback 40 allows DC coupling throughout the limiter-discriminator circuit.

The emitters of each stage, that is of each differential transistor pair 41, 42, and 43, 44 and 45, 46 are connected through an emitter resistor 52, 54 and 56 to a ground line 47 which runs alongside the amplifier in its integrated form from terminal 14 to terminal 26. The differential pairs in this circuit have single ended input, such that the base of a first of each pair is driven and that of the other is reference biased. The collector of each driven transistor (transistors 41, 43 and 45) is connected directly to the second voltage level at junction 65, while the collector of each reference transistor (transistors 42, 44 and 46) is connected to the second reference voltage level through collector resistors 51, 53 and 55. The collector of each of the latter transistors is also directly connected to the base of the next emitter follower, that is to transistors 33, 35 and 37, respectively.

The input signal is applied to the amplifier at terminals 15 and 17. Terminal 17 is directly connected to the base of the transistor 41 of the first stage. Terminal 15 is directly connected to the reference base of the second and third stages and to the second reference level which provides the DC bias for the floating input. An external capacitor 66 of approximately .05 μf. is provided between terminal 15 and ground terminal 14 so as to avoid regeneration between bases through insufficient base-source impedance. Finally, the reference bias of the first stage is provided by feedback 40, which is connected to the reference base of this stage.

As indicated, the three stages are directly cascaded and the amplifier is directly coupled to the discriminator. This is accomplished by providing the same first and second voltage reference level to both the amplifier and the discriminator and by a total feedback 40 of the amplifier output.

Transistors 33 and 35 and 37 operate as emitter followers. Transistor 33 couples stage 32 to stage 34 and transistor 35 couples stage 34 to stage 36. Transistor 37, on the other hand, provides the amplifier output from stage 36.

Transistors 33 and 35 are identical and have equal current flow which matches that of the amplifying transistor. Consequently, the collectors of transistor 33 and 35 are directly connected to the second voltage reference while their emitters are each directly connected to the base of the following stage and through a 2000 ohm resistor 67 and 68 to ground line 47.

Transistor 37, however, has increased current so as to provide good isolation of the limiter. Consequently its collector 70 is connected directly to the B+, while its emitter 71 is connected at junction 72 through series resistances 73 and 74 to ground. The emitter is also connected at junction 72 to the detector 13 and feedback loop 40.

The limiter 10 is completed by the feedback loop 40 which connects the amplifier output at junction 72 to the reference base of the first stage; that is the base of transistor 42. The loop, which includes a resistor 76 of approximately 4,000 ohms, provides a strong DC negative feedback which stabilizes the operating points of the amplifier and permits DC coupling to detector 13.

Figure 2:
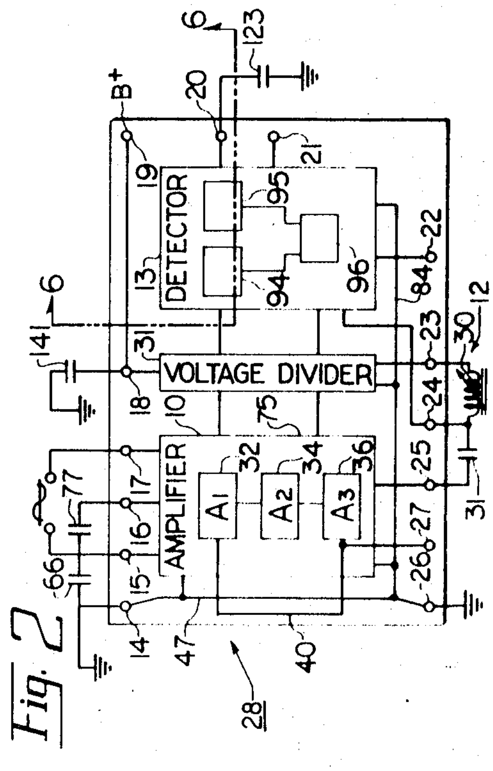
FIG. 2 is a diagrammatic view of the circuit of FIG. 1 integrated in a single chip.

In the integrated unit, as shown in FIG. 2, feedback loop 40 is brought out of pocket 75, which isolates the limiter from other integrated elements. The feedback 40 is extended outside of, but close to the ground line 47, to further reduce RF coupling, and is then brought back into pocket 75.

The feedback loop also extends to terminal 16 and an external decoupling capacitor 77 of approximately .05 μf. is connected between this terminal and the first voltage reference level, terminal 13, as shown. This decoupling capacitor 77 avoids both the loss of gain at the desired frequency and high frequency feedback, since it filters the average value of the amplifier output.

The square wave provided by the amplifier is delivered to the detector 13 by two paths. It is fed directly from junction 72 as a reference signal $S_2$ and through the LC circuit 12 to provide a quadrature signal $S_1$, to the detector.

In the integrated chip reference signal $S_2$ is delivered by conductive path 80 from the limiter output at junction 72. Two output terminals 25 and 27 are provided on the chip for connection of the external LC circuit. Terminal 25, which is connected at junction 79 between resistors 73 and 74, is used in this embodiment for the series resonant circuit 12. However, terminal 27 which is directly connected at junction 72 to the output of the limiter 10 is made available for use with parallel tuned circuits if desired.

In the preferred embodiment, resistor 73 is approximately 450 ohms and resistor 74 is 50 ohms which permits sufficient drive to the series LC circuit 12 without degrading its Q.

In the present embodiment, circuit 12 is made up of an external variable inductor 30, connected between terminals 23 and 24, and external capacitor 31, connected between terminal 24 and 25. This provides a tuned series circuit between terminals 23, 25. One end of circuit 12 is connected to the output of the limiter through terminal 25 while the other end at terminal 23 is connected to junction 62 of the voltage divider.

The quadrature output is then taken from terminal 24. Accordingly, signal $S_1$ from terminal 24 will lead the square wave input $S_2$ by 90°. Moreover any change in input frequency will modify this phase difference by a phase angle $\Phi$ which is proportional to the frequency modulation of the input signal. This quadrature output is fed through a conductive path to the base of transistor 81 which operates as an emitter follower and permits tuning of the LC circuit by an oscilloscope, etc. without undue loading. This is accomplished by means of tuning terminal 27 which is connected to the emitter of transistor 81.

The collector of transistor 81 is connected to line 82 and B+ through a 150 ohm resistor 83 whereas the emitter is connected to an extended ground line 84 through a 2500 ohm resistor 85. The output of the emitter follower is connected to a gating circuit 90 of detector 13 by conductive path 91, and delivers the differentiated signal $S_1$ to this circuit.

Gating circuit 90, which is driven by a current source 92, translates the phase difference between the square waves of path 91 and path 80 to current pulses which are combined and then filtered by integrating means 93.

Figure 3:
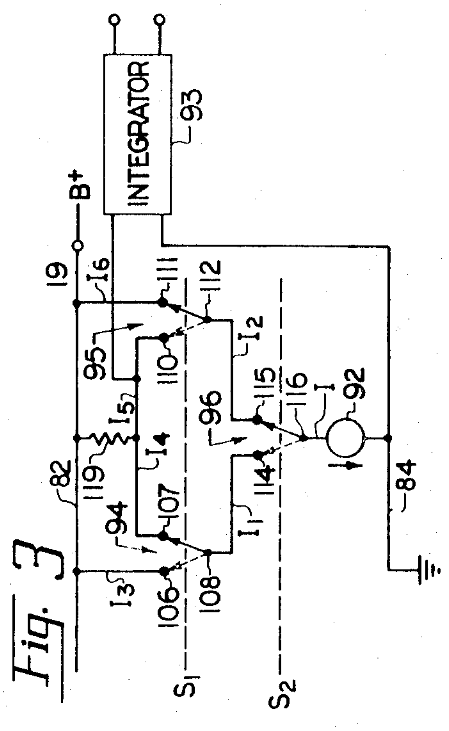
FIG. 3 is a diagrammatic illustration of the gating circuit employed in FIGS. 1 and 2.

Gating circuit 90 consists of three differentiated current switching means 94, 95 and 96 connected in a balanced circuit arrangement. The first and second switch 94 and 95 provide a switch pair which is fed by the third switch 96. Each switch is a transistor pair having a similar current carrying element connected in common. Hence, switches 94, and 95 are made up of transistors 100, 101, and 102, 103, respectively, while switch 96 is provided by transistors 104 and 105. This arrangement provides three branches for each switch, as shown in FIG. 3, and a control means (the transistor bases in this embodiment) which provides a differential current flow in proportion to appropriate input signals.

In the preferred embodiment the transistors are NPN-type. The emitters of each pair are connected in common to provide a single branch of the switch while the collectors provide the other two branches of each gate. For example, collectors 106 and 107 of transistors 100 and 101 provide a branch pair (or two poles) of switch 94 while their emitters provide a single branch 108. Similarly the collectors 110 and 111 of transistors 102 and 103 provide the branch pair and their emitters provide the one branch 112 of switch 95. Finally, the collectors 114 and 115 of transistors 104 and 105 provide a branch pair of switch 96 and their emitters provide the single branch 116.

In operation, current source 92 provides a constant uniform current flow which is diverted through appropriate switches and branches in accordance with the relative phase of signals $S_1$ and $S_2$ placed on the switch control means; in this case the bases of the transistors.

A first signal $S_1$ is applied in parallel to switches 94 and 95 while a second signal $S_2$ (which operates in this case as a reference signal) is applied to switch 96. The magnitude of both signals is made to exceed the switching threshold of the units so that the gate transistors act as pure switches. The gating unit is full, or double, balanced in that the gating of both signals is balanced. Stated otherwise, current flows in one branch of the branch pair of the third switch during each half-cycle of the second signal and current flows in every one of the branch pairs of the parallel switch pair during each half-cycle of both the first and second signal so that while the latter branches each carry a current pulse during only one-half cycle of both signals, the combined current of a complementary pair of these branches provide a current pulse or sample of both half cycles. Complementary branches as used herein refer to branches which carry pulse samples from similar portions of complementary half cycles of the input signals. Hence, branches 106 and 111 and branches 107 and 110 each provide a complementary set.

Consequently, while each branch of the branch pairs of the first and second switch contain the fundamental or carrier frequency, the complementary sets of these branches provide a doubling of the fundamental such that only the second and higher harmonics of the carrier frequencies appear. Most importantly, in the preferred embodiment, this eliminates asymmetries of the input waveform since this circuit is independent of the mark to space ratio of the reference signal.

Since the current in complementary branches of the switch pair (for example, 107 and 110 of switches 94 and 95) are a function of both signals, are in phase with each other, and provide a sample of both half cycles of both signals, the total current is a function of the phase difference between signals and waveform asymmetries are rejected.

Of course, the current in the remaining set of complementary branches 106 and 111 will also be proportional to the phase difference. The current of the latter is the antiphase of that of the first set, however, it can be used separately or in conjunction with the first set for push-pull output.

The parallel pair of switches 94 and 95 are coupled to one side of the current source 92 by the connection of their branch pairs 106, 107 and 110, 111 to the B+. The single branch of each switch is connected to one of the branch pair 114 and 115 of the third gate 96 and through it to the other side of current source 92 by branch 116. Hence, the overall current flow of each parallel switch is controlled by that of the third switch, and the total current of circuit 90 is, in turn, determined by the current of source 92.

Current source 92 provides a constant current flow I through the gating unit 90. Current I will flow from switch 96 in branch 116 while a proportionate amount of this current, which may be designated as $I_1$ and $I_2$, will also flow in branches 114 and 115 respectively. Finally, the current flowing in branches 106, 107 and 110, and 111 may be designated as $I_3$, $I_4$, $I_5$ and $I_6$ respectively. Of course the total current flowing through switches 94 and 95, that is $I_3+I_4+I_5+I_6$, will equal that flowing in switch 96, namely, $I_1+I_2$, which is, in turn, equal to the current I of source 92.

Current source 92, which may be any suitable current source, is provided in this embodiment by a transistor 120, a resistor 121 and a diode 122. Resistor 121, which is approximately 8000 ohms, is connected between the B+ supply of terminal 19 and the base of transistor 120. The emitter of transistor 120 is connected to ground line 84, and its collector is connected to the common branch 116 of switch 96. Diode 122, which matches the voltage drop of the emitter-base junction of transistor 122, operates with resistor 121 to define a bias current, such that transistor 120 draws a continuous current I.

Current I flows from the B+ power supply 19 toward the collector of transistor 120 through the two parallel current gates 94 and 95 and one common-current gate 96. If square wave or sinusoidal signals of sufficiently high amplitude (exceeding the threshold switching value of the switches) are applied to the control means, the transistor gates behave as quasi-ideal switches and rectangular or square current-pulses will flow through all collectors. The ideal situation is shown in FIG. 3, where each transistor pair has been replaced by a two-position switch. The control signals at $S_1$ and $S_2$ define at any instant how the total current I is partitioned between the different available paths.

Figure 4:
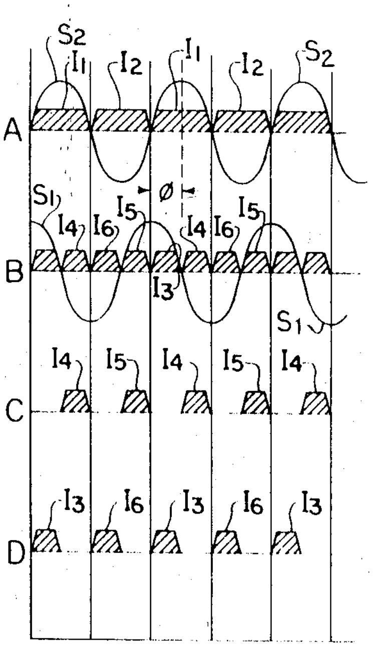
FIG. 4 is a graph illustrating the phase to amplitude translation of the gating circuit of FIGS. 1 and 3.

In the preferred embodiment, two signals of the same frequency but 90° phaseshift are applied at $S_1$ and $S_2$ and the resulting current waveforms are indicated in FIG. 4. As shown in A of this FIG., the reference signal $S_2$ transforms the continuous current I into square wave-pulses $I_1$ and $I_2$, 180° apart. Each of these current pulses become the current source for gates 94 and 95, where they are then split by signal $S_1$ as shown at B. Finally through the load resistor 119, two current-pulses $I_4$ and $I_5$, as shown at C, will flow per cycle. Current $I_4$ will flow during the time when transistors 104 and 101 are simultaneously closed while current $I_5$ will flow during the time when 105 and 102 are simultaneously closed. This provides a sample during both half cycles of both inputs and double balanced gating.

If the collector voltage of 107 and 110 is filtered with capacitor 123, as in FIGS. 1 and 2, its average value will be directly proportional to the average value of $I_4+I_5$; that is to the area of the current-pulses shown at C in FIG. 4, or to the phase difference Φ between signals $S_1$ and $S_2$. Moreover since the gating circuit is double balanced, the current pulses of complementary branches (106 and 111 or 107 and 110) are representative of the difference in phase which occur in both half cycles of the input signals and any asymmetries of these signals are cancelled.

Figure 5:
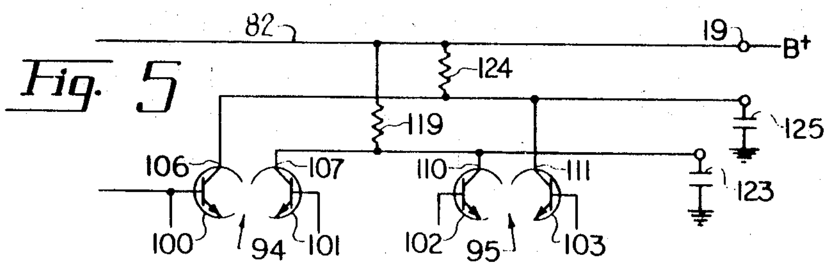
FIG. 5 is a modification of the gating circuit which provides a double ended output.
Figure 6:
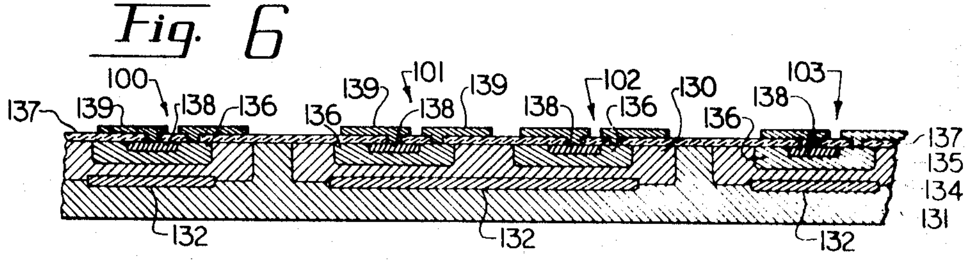
FIG. 6 is a view in section of the integrated substrate taken along the line 6—6 of FIG. 2.

Advantageously, a double ended output may be provided by also filtering the collector voltage of transistors 100 and 103. This provides a voltage amplitude proportional to the area of the current pulses $I_3$ and $I_6$ shown at D in FIG. 4. As shown in FIG. 5, this may be accomplished by connecting in common collectors 106 and 111 of these transistors through a second load resistor 124 to the B+, and to an additional filtering capacitor 125.

In this embodiment, each gate is a transistor pair operated with single input. Hence, the signal is applied to one side of each switch while a reference voltage or DC bias is applied to the other. For example, applying the embodiment of FIG. 5 to the basic structure of FIG. 1, signal $S_2$ is applied to the base of transistor 104 through conductive path 80, while the switch is DC biased to the first reference voltage which is applied to the base of transistor 105 by conductive path 78. Similarly $S_1$ is applied in parallel to the bases of transistors 100 and 102 through path 91 while the differential pair is biased, in each case, to the second voltage reference level. The latter is accomplished by connection of the bases of transistors 101 and 103 to the second reference level by lead 88.

In the preferred embodiment the integrator includes capacitor 123 and resistor 119. Capacitor 123 is an external capacitor connected between ground and terminal 20 which is, in turn, connected in common to collectors 107 and 110. An emitter follower transistor 126 decouples the output of the gating circuit 90 from any external load connected at terminal 21.

Transistor 126 is biased through a collector resistor 127 to the B+ supply terminal 19 and through an emitter resistor 128 to ground. Its base is connected in common to the collectors of transistors 107 and 110, and its emitter is also connected to output terminal 21. The output of the circuit is developed across terminal 21 and ground.

For convenience, a cross section of only a portion of the chip 16 is shown in FIG. '. This illustrates the construction of the parallel switches 94 and 95, and is taken through transistors 100, 101, 102 and 103. Transistors 101 and 102 are provided in a common pocket 130 since they have a common collector connection. Transistors 100 and 103 also have a common collector, however, these are not isolated from the remainder of the epitaxial layer since they are connected directly to the B+. It should be evident, however, that for double ended operation, schematically illustrated in FIG. 5, the latter transistors would also be within their own pockets.

Chip 10, is fabricated by first forming isolated pockets 130 of one conductivity type, for example N-type, in a semiconductor body 131 of opposite P-type conductivity. A high-conductivity N-type zone 132 is also provided at the bottom of each pocket.

This isolated pocket construction can be provided in any conventional manner in silicon or other semiconductive material. For example, epitaxial layer construction of opposite P-type conductivity. A high-conductivity N-type zone 132 is also provided at the bottom of each pocket.

This isolated pocket construction can be provided in any conventional manner in silicon or other semiconductive material. For example, epitaxial layer construction is suitable; in fact, any technique which provides electrically isolated regions would be suitable.

In the preferred embodiment, the unit is constructed by first forming a P-type monocrystalline silicon substrate 131 of high conductivity having, for example, an impurity concentration of approximately $10^{19}$ atoms/cm$^3$. Thereafter N-type regions 132 having a resistivity of approximately 15 ohms per square are provided by diffusion or the like in appropriate portions of surface 134 of the substrate. An N-type epitaxial layer 135 having about 1ohm-cm resistivity is then formed over substrate 131 and areas 132. Thereafter isolated pockets 130 are formed by producing P-type walls, such as by diffusion or the like, which extend through the epitaxial layer 135 to the substrate 131. These isolating walls which have a high conductivity of about $10^{19}$ atoms/cm$^3$ impurity concentration are provided around any integrated circuit component not directly connected to the B+.

For example a large pocket 75, shown schematically in FIG. 2, encloses the three amplifying stages of limiter 10 while a smaller pocket encloses each stage. Moreover, still smaller pockets isolate transistors whose collectors are not connected in common. This minimizes parasitic coupling within the chip and permits high frequency performance.

The units are completed in each pocket by standard planar diffusion techniques, or the like. For example, a base region 136 having high P-type conductivity of about $10^{19}$ atoms/cm$^3$ impurity concentration is formed through openings (not shown) in the oxide coating 137. Thereafter an emitter region 138 having high N-type conductivity of about $10^{21}$ atoms/cm$^3$ impurity concentration is formed in each base region 136. Interconnection is provided by metallic surface paths 139 deposited on the oxide surface. The metallic deposits, which may be aluminum or the like, make contact with appropriate regions through openings in the oxide coating 137 and extend along the surface to contact elements of other pockets and chip terminals, etc.

In the integrated chip, all active units are simultaneously formed by diffusion or the like to insure identical junction profiles. Furthermore the junction areas are also identical except for the emitter area of transistor 37 and the cathode area of diode 61 which operates at higher current levels than the other elements and have areas proportional to the ratio of their current to that of the other elements which they must match.

For example the amplifier transistors each draw .7 ma. whereas the final output transistor 37 draws 3 ma. in order to insure good isolation of the limiter. Consequently, the emitter base junction area of transistor 37 must be approximately four times that of all other limiter transistors. This provides constant current density in the units and matches the voltage drop of their emitter base junctions. Similarly transistor 81 draws 1 ma. while diode 61 draws 9 ma., thus the cathode area of the latter (emitter area of a transistor with the collector-base shorted) is made approximately 9 times that of transistor 81.

Moreover, except for diode 61, which has increased emitter area, all diodes are matched to each other and the base-emitter junctions of the transistors. This is accomplished by forming standard transistors and then shorting its collector to its base. Finally, it is particularly important that in current source 92, the diode 122 should match the base-emitter junction of transistor 120 for suitable current control.

In the preferred embodiment, the integrated chip is 60×60 mils square. Standard pockets for a single transistor are 4×4½ mils, enclosed by a one-half mil wide isolation wall. The base area is about 2×2½ mils and that of the emitter is 1×1 mil. In all cases, the distance from diffusion to isolation generally exceeds 1 mil.

The interconnecting conductive paths, such as line 78, 80 and 91 etc. are one-half mil wide deposits of aluminum. Ground line 47, however, is 2 mils in width so as to provide low-common resistance.

The collector resistor and the emitter resistor of each stage of the limiter (for example, resistors 51 and 52 of stage 32) are controlled by simultaneously diffusing three 1000 ohm resistors. Thereafter two of these are connected in parallel to provide the 500 ohm emitter resistor.

In the integrated chip, the transistor units have the following physical properties:

| | |
|---|---|
| Emitter-area | 1 mil$^2$ |
| Base-area | 6 mil$^2$ |

| | |
|---|---|
| Collector Pocket | 24 mil² |
| base-junction Depth | 3×10⁻⁶ meters |
| Emitter-junction Depth | 2×10⁻⁶ meters |

In the preferred embodiment, a minimum of external components are required to complete the circuit. As indicated, a decoupling capacitor 77 is connected between feedback terminal 16 and input terminal 15. In addition, the DC reference voltage of the input is also decoupled by capacitor 66 which is connected between terminal 15 and ground terminal 14. The input to the voltage divider is decoupled by capacitor 141, connected from terminal 18 to ground, and integrating capacitor 123 is connected between terminal 20 and ground. Finally coil 30, connected between terminals 23 and 24 along with capacitor 31, connected between terminals 24 and 25 complete the unit. To avoid inductive effects, all leads of the capacitors are made as short as possible: for example, considerably less than one-half inch in length.

In the preferred embodiment, the capacitive and inductive components are external to chip 10, however, some of the capacitors could be provided on the chip, as for example, a monolithic capacitor.

The following table lists a typical set of component values for operation of the circuit shown in FIG. 1 at a frequency of 4.5 MHz.

| | |
|---|---|
| Coil 30 | 50 μh |
| Capacitor 31 | 30 μf |
| Resistor 51, 53 and 55 | IK ohms |
| Resistor 52, 54 and 56 | 500 ohms |
| Resistor 63 | IK ohms |
| Capacitor 66 0.05 μf | |
| Resistor 67 and 68 | 2 K ohms |
| Resistor 73 | 450 ohms |
| Resistor 74 | 50 ohms |
| Resistor 76 | 4 K ohms |
| Capacitor 77 | 0.05 μf |
| Resistor 83 | 150 ohms |
| Resistor 85 | 5 K ohms |
| Resistor 119 and 124 | 10 K ohms |
| Resistor 121 | 8 K ohms |
| Capacitor 123 and 125 | 0.01 μf |
| Resistor 127 | 200 ohms |
| Resistor 128 | 5 K ohms |
| Capacitor 141 | 0.05 μf |

The electrical characteristics of all transistors (with the exception of transistor 37 which has four times the emitter area of the other active elements) are similar to Mstorola transistors 2H916.

the electrical characteristics of all transistors with the exception of transistor 37 which has four times the emitter area of the other active elements) are similar to motorola transistors 2H916.

Advantageously gating circuit (), which operates in the preferred embodiment as a phase detector to provide FM discrimination, may be employed in several different applications by varying the input signals $S_1$ and $S_2$. It should be understood that the choice of input terminals for application of the particular signal is generally a matter of design and is determined in the preferred embodiment by the DC bias arrangement.

Other characteristics of the gating circuit should also be noted. For example in phase detection the signals are the same in frequency and both exceed the switching threshold of the transistors so that they operate as pure switches. As indicated one signal is applied in parallel to the control means of switches 94 and 95 by a first input terminal means (lines 88 and 91) while the other signal is applied to switch 96 by a second input terminal means (lines 78 and 80). In this case, the output voltage of the gating unit is then linearly related to the relative phase difference, Φ, between both signals.

On the other hand, for synchronous detection, while both signals are also identical in frequency, one signal which carries information is made to have an amplitude less than the switching value of the transistors it controls whereas the amplitude of the other signal, which is an unmodulated reference carrier, is generally greater than the switching value of the switch it controls. For the described transistors the amplitude of the information bearing (modulated) signal is made less than 100 m. Vpp to avoid distortion of the signal envelope.

In this case the amplitude modulation of the information carrying signal is recovered at the gate output; for example by coupling to either set of complementary branches of the switch pair, as in the preferred embodiment. In this operation, which has importance in applications for color demodulation in TV receivers, the gating circuit also operates as a full balanced detector for both the reference signals such that only the second and higher harmonics of the reference frequency will appear at the output. This facilitates filtering and reduces parasitic feedback paths.

The two synchronous demodulations required in any color TV receiver using the present NTSC standards is accomplished in accordance with the invention by a doubling of the (illustrated gate circuit arrangement. That is two of the described gate circuits are employed with three input signals. Each circuit has a switch pair fed by a third differential switch and a current source. It is preferred that each gate circuit have its own current source although a single source for both would be possible.

In a preferred arrangement, the third gate of each circuit is controlled by the croma subcarrier signal of the TV transmission while the gate pair of one gate circuit is controlled by a reference signal (O°phase shift) and the gate pair of the other circuit is controlled by a quadrature signal signal (90° phase shift) developed from the transmitted signal.

The amplitude of the croma signal is made less than the threshold switching value whereas the amplitude of the zero reference signal and that of the quadrature signal is made to exceed the threshold value. Consequently, blue color information is obtained by integrating the current pulses of the first gate circuit, red color information from the output of the second gate circuit, and finally, green color information is obtained by combining in a matrix the antiphase or complementary outputs of both gate circuits. The latter is provided by combining pulses of the remaining sets of complementary branches of both gate circuits.

Other uses of the gating circuit are also possible. For example, by applying signals of different frequency to the two inputs, it can be made to operate as a mixer. Hence, if the signal applied to the first terminal has a frequency $F_1$ and the signal applied to the second terminal has a frequency $F_2$, the two will be mixed to provide an output signal from the gate circuit having a frequency equal to their difference; that is $F_2$–$F_1$.

Accordingly in superheterodyne receivers, $F_1$ may be the frequency of the modulated, information bearing, signal and $F_2$ the frequency of the local oscillator. Again, due to the symmetrical character of the double balanced gating circuit the fundamental of either signal, or more importantly the local oscillator component, will not appear at the output terminals.

In this example, amplitude distortion is again avoided by making the amplitude of the information signal less than the threshold switching value of the transistors it controls. The other signal may, however, exceed the threshold value, or not, as desired. Thus two modes of operation of the mixer are possible since the local oscillator signal may be used for sinusoidal driving, where it is less than the threshold value, or for square wave driving where it exceeds this value. In either mode, the output of the gating circuit provides an amplitude envelope proportional to that of the information hearing signal at a frequency which is a combination of both signal frequencies and does not contain the fundamental or carrier frequency of either.

Many variations of the described gating circuit are possible. As indicated, double ended operation can be obtained. Moreover, any suitable current source, for example a resistor or the like, may be employed with the gating circuit. Discrete and integrated components may also be utilized, and although NPN-transistors are described, PNP-transistors may also be suitable with appropriate modifications of the circuitry.

This it should be understood that many modifications are possible without departing from the spirit and scope of the invention, which is to be limited only by the scope of the appended claims.

What is claimed is:

WHAT IS CLAIMED IS:

1. A double balanced gate circuit comprising a first and second differential switching means fed by a third differential switching means and a current source, means for providing a reference signal and a quadrature signal, a first terminal means for application of one of said signals to a control means of said first and second differential switch, and a second terminal means for application of the other signal to a control means of said third differential switch, and an output means connected to said first and second switch for providing a gate circuit output proportional to the phase difference between said signals during each half cycle thereof, and an integrating means coupled to said output means for providing an amplitude envelope proportional to said output.

2. A gate circuit as claimed in claim 1 including a second gate circuit having a pair of differential switching means fed by another differential switching means, said second gate circuit having a first terminal means for application of a signal to a control means of its switch pair and a second terminal means for application of a signal to a control means of its other switching means, and one terminal means of said second gate circuit being coupled to one terminal means of the first gate circuit for application of one signal to both circuits.

3. A gate circuit as claimed in claim 1 wherein each of said switching means are transistor pairs, said transistor pairs having a current carrying element in common connection to provide a single branch of each switching means, the other current carrying element of each transistor pair providing a branch pair of each switching means, and the bases of said transistors providing a control means of each switching means; each of said control means being capable of diverting the current of said single branch through either of the other branches of its switch in accordance with a signal thereon; said switching means having said single branch of each of said first and second switching means coupled to one branch respectively of said branch pair of said third switching means, and said single branch of said third switching means coupled to said current source; and said gating circuit including an integrating means coupled to one set of complementary branches of said branch pairs of said first and second switching means so as to provide an output proportional to the combination of said first and second input signals.

4. A gate circuit as claimed in claim 3 including another integrating means coupled to the other set of complementary branches of said branch pairs of said first and second switching means so as to provide a double ended output.

5. A gate circuit as claimed in claim 3 wherein said first and second signals have the same frequency but are different in phase, and the amplitude of both signals exceed the switching threshold of said switching means so that the output of said gate circuit provides an amplitude envelope proportional to said difference in phase.

6. A gate circuit as claimed in claim 3 wherein said first and second signals are identical in frequency and one of said signals is an information bearing signal and said information bearing signal having an amplitude less than the threshold switching value of the switching means to which it is applied so that said integrating means provides an amplitude envelope proportional to that of said information signal.

7. A gate circuit as claimed in claim 3 wherein said first and second signals are different in frequency and one of said signals is an information bearing signal, and said information bearing signal having an amplitude less than the threshold switching value of the switching means to which it is applied so that said integrating means provides an amplitude envelope proportional to that of said information bearing signal and at a frequency which is a combination of both signal frequencies.

8. A gating circuit as claimed in claim 3 wherein said first, second, and third switching means are a first, second, and third transistor pair; each of said transistor pairs having a current carrying element in common connection to provide said single branch, the other current carrying element of each transistor pair providing said branch pairs; and the bases of each transistor pair providing said control means of each switch.

9. A gate circuit as claimed in claim 3 wherein said transistor pairs are NPN-transistors, each pair having a common emitter connection which provides said single branch, and said collectors provide said branch pair.

10. A gate circuit as claimed in claim 3 wherein a common connection of complementary branches of the branch pairs of said first and second switching means is provided by a common impurity region of complementary transistors of said first and second transistor pairs.

11. A gate circuit as claimed in claim 3 wherein the impurity profile and junction area of said first transistor pair equals those of said second so as to provide matching voltage drops therein, and the impurity profile and junction area of each transistor of said third pair are equal so as to provide matching voltage drops therein.

* * * * *